United States Patent

[11] 3,598,977

| [72] | Inventor | James H. Clemmons<br>2 N 461 Pleasant, Glen Ellyn, Ill. 60137 |
|---|---|---|
| [21] | Appl. No. | 766,683 |
| [22] | Filed | Oct. 11, 1968 |
| [45] | Patented | Aug. 10, 1971 |

[54] SPECIAL-PURPOSE COMPUTING APPARATUS FOR DETERMINING CONSTRUCTION DATA FOR WIRE-WOUND ELECTRICAL COMPONENTS
14 Claims, 9 Drawing Figs.

[52] U.S. Cl. ............................................ 235/151.1,
235/151
[51] Int. Cl. .......................................... G06g 7/48
[50] Field of Search ................................... 235/151.1,
151, 151.11, 150.1; 340/147; 29/602, 605, 606

[56] References Cited
UNITED STATES PATENTS

| 3,324,458 | 6/1967 | MacArthur | 235/151.1 |
| 3,391,275 | 7/1968 | Bullock et al. | 235/151.1 |
| 3,400,374 | 9/1968 | Schumann | 235/151.1 X |
| 3,484,621 | 12/1969 | Hugle | 235/151.1 X |

Primary Examiner—Malcolm A. Morrison
Assistant Examiner—Joseph F. Ruggiero
Attorney—Merriam, Marshall, Shapiro & Klose ABSTRACT: Apparatus for determining the values of construction parameters required for constructing wire wound electrical components, such as a power transformer, in accordance with certain essential and optional input design parameters, including storage means for receiving and storing data relating to the essential input design parameters, memory means for storing empirical data relating to the values of the optional parameters as a function of the essential parameters, selector means responding to the values of the entered essential parameters in the storage means for selecting from the stored empirical data the respective values of the optional input design parameters, and controlled calculating means operationally connected to the storage means and to the selector means for determining the respective values of the required construction parameters.

SPECIAL-PURPOSE COMPUTING APPARATUS FOR DETERMINING CONSTRUCTION DATA FOR WIRE-WOUND ELECTRICAL COMPONENTS

FIELD OF THE INVENTION

This invention relates to computing apparatus and more specifically to such apparatus for determining the required construction data to meet the desired design specifications of wire wound electrical components such as power transformers, output transformers and chokes.

DESCRIPTION OF THE PRIOR ART

The design of such electrical components in the past has been obtained by tedious computations by experienced individuals who are thoroughly familiar with the design parameter requirements, and who particularly rely on their intuition and memory of several key factors during the calculations. For example, the calculations for a standard type of power transformer having a single secondary winding would require approximately one hundred calculations, including approximately 10 intuitive factors which are entered by the designer during calculations. The requirements of another secondary winding greatly increases the number of calculations and the design time. The design of wire-wound electrical components can be seen from the following example in which there is set forth steps for designing a power transformer. In designing the transformer, the designer starts with the various initial design specifications which are used in the design procedure. For a power transformer using E-and-I type laminations, such specifications would be the following:

1. primary voltage;
2. secondary 1 through 5 voltage;
3. secondary 1 through 5 current;
4. temperature rise in degrees centigrade for the completed transformer;
5. current density in circular mils per ampere;
6. magnetic flux density in kilolines per sq. in.;
7. wire size in B&S gauge number;
8. iron size—width in inches of center leg of E and I laminations;
9. stack size—height in inches lamination stack;
10. layer insulation in mils—insulation between layers of a winding; and
11. winding insulation in mils—insulation between windings.

Of the above design specifications, only the primary and secondary voltages and the temperature rise are essential, the remaining items being obtainable from the essential parameters using various intuitive factors known substantially only by those skilled transformer designers versed in this art. The output construction data required in order to construct a power transformer includes the following.

For the primary winding and each secondary winding:
1. number of turns;
2. wire size;
3. layer insulation thickness;
4. winding or wrapper thickness;
5. winding length;
6. coil length;
7. copper weight;
8. DC resistance;
9. primary load current;
10. turns per layer;
11. layers; and
12. percent build.

In order to arrive at the output construction data required to obtain a transformer meeting the specification factors in the initial data, it is necessary to perform a series of detailed and tedious computations involving many intuitive and empirical factors which, in the case of designing power transformers, are given in the following outline I. Determine Total Secondary VA
  A. Determine VA for each secondary
    1. Multiply volts by current
  B. Determine total secondary VA by adding A
II. Determine Primary Current
  A. Divide secondary VA by primary volts
  B. Multiply by efficiency factor, $E_{ff}$
    1. $E_{ff}$ determined by VA category
III. Determine Iron size and Stack
  A. Determine area
    1. $A = \sqrt{VA}/5.58$
  B. Determine iron size
    1. Should be smaller than stack
    2. Must be selected per punched lamination increments of available sizes
  C. Determine stack
    1. Product of iron size and stack should be equal to $A$ (in III A1)
    2. Stack must not exceed 1.75 times iron size for economics of manufacturing
IV. Determine Primary Turns
  A. $N_p = \dfrac{V_p(10^8)}{4.44 BAfK}$
    1. $V_p$—given
    2. $f$—given
    3. $k$—0.9 (stacking factor)
    4. $A$—determined from III A1
    5. Determine magnetic flux density, $B$
      a. Given, or
      b. Estimated from value of $VA$, or
      c. Estimated from value of $VA$ with maximum value of $B$ given.
V. Determine Primary Wire Size A. Circular mils = $\dfrac{\text{cir. mils}}{\text{amp}} \times \text{amps}$ 1. Determine amps from II
    2. Determine c.m./a. from temperature rise and VA
VI. Determine Primary Winding Data
  A. Determine turns/layer
    1. Determine maximum turns/layer
      a. Iron size (III B)
      b. Wire size (V)
    2. Determine actual turns/layer and number of layers
      a. Last layer should be full
  B. Determine primary build—between center leg and outer leg
    1. Tube thickness
    2. Number of layers multiplied by diameter of wire and layer insulation
      a. Layer insulation determined by wire size—Mechanical determination
    3. Wrapper insulation
VII. Determine Primary DCR and Copper Weight
  A. Find MLT—Mean Length of Turn
    1. Inside perimeter of tube and 8 times thickness of tube and 4 times primary build as found in VI B. Thickness of tube given from lamination or iron size
  B. Find DCR of primary
    1. Multiply MLT by number of turns, divide by 1,000 and multiply by DCR per 1,000 inches
      a. DCR per 1,000 inches given by wire size
  C. Find primary copper weight
    1. Divide DCR by ohms/1b.
      a. Given from wire size in 1bs./ohm
VIII. Determine Secondary Turns A. $N_{s1} = \dfrac{(V_{s1})N_p}{V_p}$ 1. $V_{s1}$ = open CKT secondary, voltage
      a. 5—8 percent higher than full load
        (1) YA determines regulation
IX. Determine Secondary Wire Size
Repeat steps as for primary—from V using respective secondary data.

In view of the above tedious calculations, most transformer manufacturers simply manufacture a standard line of transformers with the individual user being required to compensate for the failure of the transformer manufacturer to meet his specific requirements. In the event only a few transformers are required, it is not economical for the transformer manufacturer to have his design engineers perform the tedious and time consuming calculations to provide a specific transformer meeting the customer's requirements. Various efforts have been made in the past to provide nomographs and special slide rules which can assist the designer in the design process, however, such instrumental aids do not significantly reduce the number of steps required in the process. Furthermore, much of the important data in selecting specification factors in the initial design of the components are specified by designers who are specially skilled in this art and rely on their intuition and memory of previous design calculations.

SUMMARY OF THE INVENTION

As opposed to such hit-and-miss attempts in the past, the apparatus of the present invention can provide a complete power transformer design within a few seconds, even if only the essential design parameters have been entered. The apparatus includes stored data relating all of the optional parameters to the essential parameters, and in response to the values entered for the essential parameters, the corresponding values for the optional parameters which have not been entered are selected and stored for further calculations in determining the output construction data required. Therefore, starting with the basic essential specification factors of primary and secondary voltage and current, and temperature rise, the apparatus of this invention provides the remaining required specification factors and the complete design for even a novice designer having no previous experience in designing the transformers.

DESCRIPTION OF THE PREFERRED EMBODIMENTS

Figure 1:
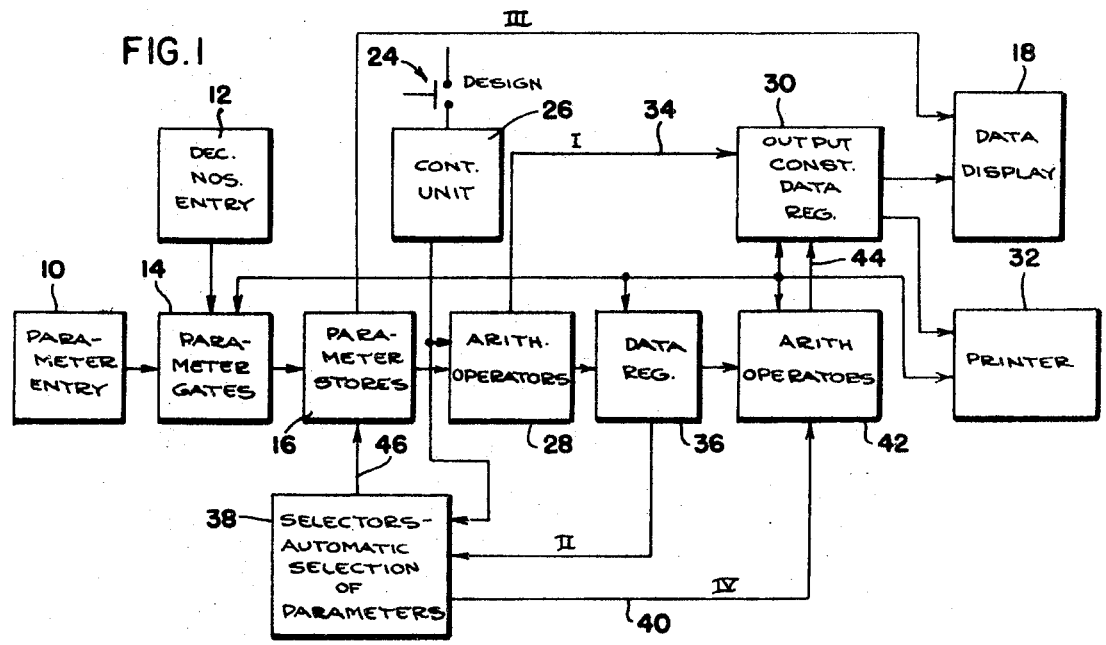
FIG. 1 is a schematic diagram illustrating the general apparatus according to the present invention and the indicated flow paths for providing the output construction data required in the construction of power transformers corresponding to certain essential input design parameters.

Referring now to FIG. 1, there is illustrated an information flow diagram which in schematic block diagram form indicates the flow of information in the apparatus of this present invention. Input information regarding a parameter which is to be used in the design is entered in the parameter entry 10 with its magnitude entered into the numbers entry 12. Information from the parameter entry and numbers entry operate the respective parameter gates 14 to transfer the information into the parameter stores 16. During the entry procedure, if the operator wishes to check the information he has entered, he can request this information for the specific parameter entry and the data previously entered will be displayed on the data display 18. The various input parameters 10 are shown in the schematic view of FIG. 2 of the computing machine front panel 20, with the display unit 18 comprising four character readout devices 22.

In the initial parameter entry procedure the operator depresses the respective parameter button and the desired number button to store the respective parameter information in parameter stores 16. After all parameter entries have been entered, the operator depresses design button 24 which operates the control unit 26 controlling the sequencing of the machine apparatus. The control unit is a well-known type of apparatus including a clock (200 KC.) which runs a counter, the output of the counter controlling gate circuits associated with the respective circuit sections in the machine. The apparatus is then sequenced by the control unit 26, and as the data for each construction requirement is determined through the operation of arithmetic operators 28, 42 such as multipliers, adders, dividers, etc., the respective output information is gated and transferred into the corresponding construction data registers 30 for display when requested on the display 18 and/or to a printer 32 from which is obtained a permanent record.

As indicated previously, the apparatus of this invention affords the designer the opportunity to place in all of the parameters which are required for specifying the construction data, or of only entering certain essential parameters and letting the machine specify the remaining optional input parameters. In the event the operator has furnished the machine with all of the required input parameters, that is, both the essential and optional parameters, the control unit 26 directs the arithmetic operators 28 to operate on certain of the input parameters, and via line 34 some of the required construction data is transferred to registers 30. The remaining required output construction data is calculated from selected data stored in registers 36. Using the essential and optional parameters in stores 16, the selectors 38 select respective data from registers 36, and through line 40, operators 42, and line 44 the remaining required output data is transferred to registers 30.

If the operator has only entered the essential parameters and less than all of the optional parameters, the machine utilizes such parameters to automatically select the remaining optional parameters through the selector 38 and the data stored in registers 36 and transfers this information through line 46 to the respective parameter stores 16. Both the essential and optional parameters are then utilized to determine the required output construction data as previously outlined. From the very brief description of FIG. 1, it can be seen that the apparatus of this invention readily enables one who has no experience whatsoever in designing transformers to merely place in the essential input parameters and obtain the required construction data for the transformer, with the machine selecting all of the necessary information from the data registers 36 for determining the optional parameters and the output data. As will be more particularly described hereinafter, the registers 36 contain data on: 1. the optional parameters and other factors as empirical functions of certain respective essential parameters; and 2. certain optional parameters and calculation factors as a function of other respective optional parameters.

To display the output construction data on the display unit 18, the operator depresses the respective construction data buttons 46 and the corresponding information is presented on the readout devices 22. If the operator is satisfied with the design, he can obtain a permanent recording of the final construction data by depressing print button 48, which transfers the information from construction data registers 30 to a well-known type of printer apparatus 32.

As an assistance in following the detailed description of the apparatus of this invention, the table below lists the information flow paths I, II, III and IV, as indicated in FIG. 1, for each of the output construction data parameters with the abbreviations in the table identified as follows:

| | |
|---|---|
| IS — | Iron Size |
| B — | Flux Density |
| SS — | Stock Size |
| WD — | Wire Diameter |
| TT — | Tube Thickness |
| LI — | Layers Insulation |
| WI — | Winding Insulation |
| WS — | Wire Size TZPS |

Flow path I illustrates transferring information from the stores 16 through operators 28 to the output construction data registers 30; flow path II illustrates the selection of data from registers 36; flow path III illustrates transferring information from stores 16 directly to the display 18, and flow path IV illustrates operating on the selected data from registers 36 for determining other data which is transferred to the output registers 30.

TABLE A

| Output construction data parameter | Flow path—all essential and optional parameters entered | Flow path—only essential parameters entered |
|---|---|---|
| Turns | I | II (IS, B, SS)→IV. |
| Wire size | III | II→III. |
| Layer ins | III | II(WS)→II→III. |
| Winding ins | Same | Same. |
| Coil length | II→IV | II (IS)→II→IV. |
| Winding length | Same | Same. |
| DCR | II (WD, TT, LI, WI)→IV | II (WS, IS, B, SS)→II (WD, TT, LI, WI)→IV. |
| Copper weight | Same | Same. |
| Turns/layer | II (WD)→IV | II (WS, IS, SS, B)→II (WD)→IV. |
| Number layers | Same | Same. |
| Unused partial layer | Same | Same. |
| Temperature rise | III | III. |
| Primary current, $I_p$ | II (Eff)→IV | II (Eff)→IV. |
| Iron size | III | II→III. |
| Stack size | III | II→III. |
| Percent build | II (WD, TT, LI, WI)→IV | II (WS, IS, B, SS)→II (WD, TT, LI, WI)→IV. |

As an example, referring to table I, to determine the number of turns for the primary and for each secondary—the second column of table I indicates that if all essential and optional parameters have been entered, the control unit 26 transfers information on flow path I, that is, from stores 16, operators 28 to the output construction data register 30 for display. If only the essential parameters have been entered, the nonentered optional parameters IS, B and SS must be selected from selector 38 and data registers 36 to determine the turns as indicated by flow paths II→IV.

In FIGS. 3—9 there is illustrated a block diagram of the machine constructed in accordance with the principles of this invention. In this embodiment of the invention the illustrated apparatus is sufficient to design a power transformer constructed of E- and I-type laminations, which is the type of lamination most commonly used in power transformer construction. The input parameter entries 10 include the required input parameters for properly designing a power transformer as previously indicated. The optical input parameters which may or may not be specified are clearly indicated in FIG. 3.

Figure 2:
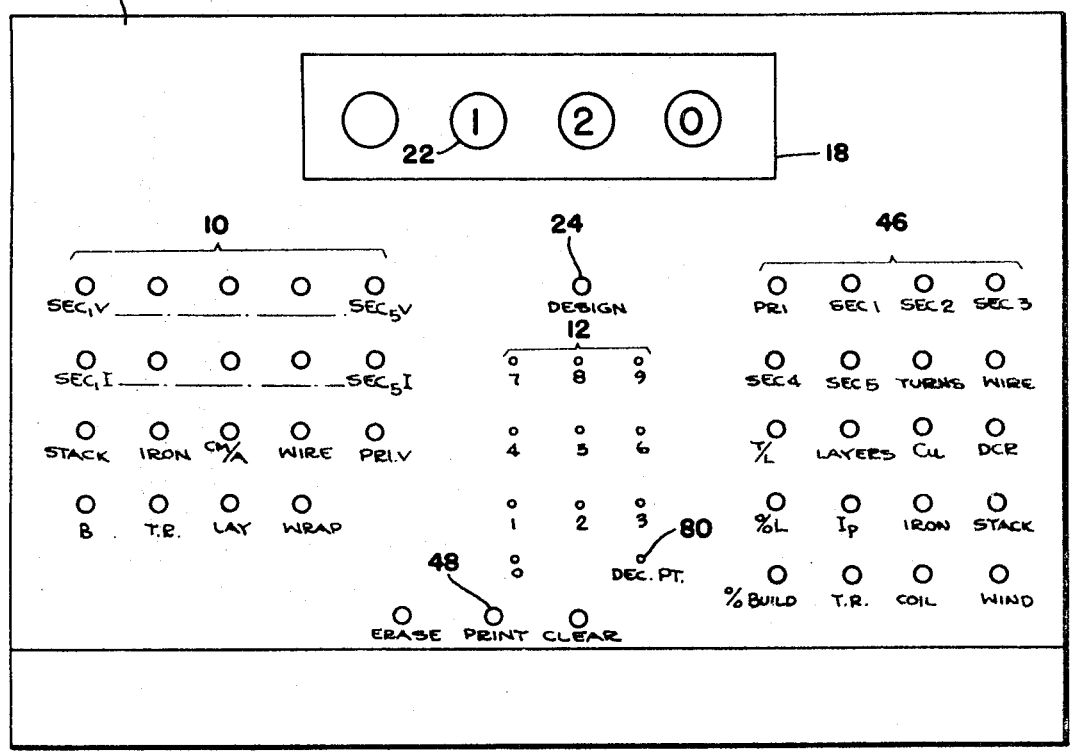
FIG. 2 is an illustration of the front panel of the apparatus of this invention indicating the various input design parameters and the output construction data parameters required in designing power transformers.
Figure 3:
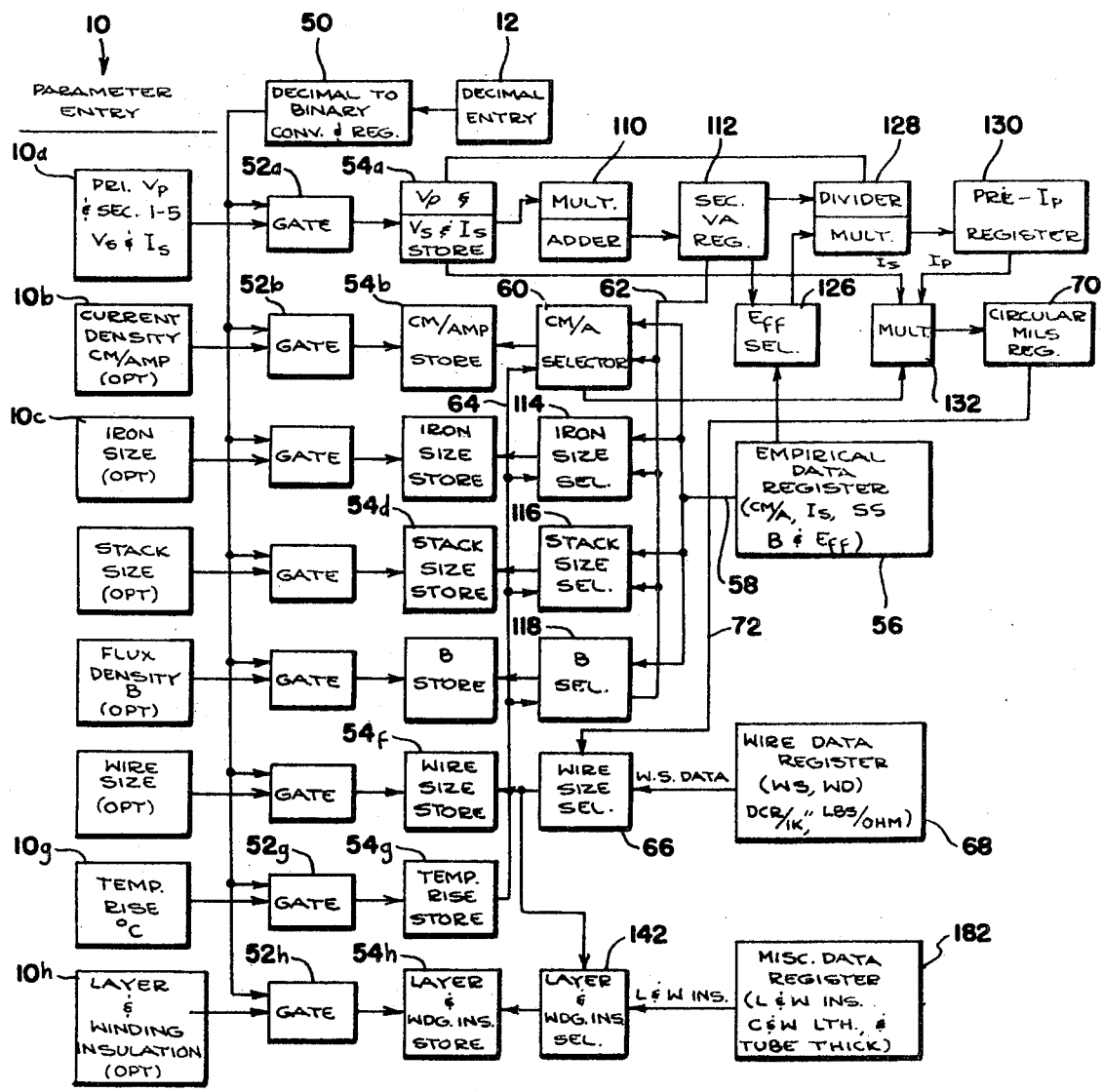
FIG. 3 is a schematic diagram illustrating in block diagram form various apparatus of the invention, including data registers from which the required values of the optional input design parameters indicated in the figure can be selected and calculated from the data stored in such registers.

In order to avoid repetition in the illustration of FIG. 3, the first input parameter entry actually comprises 11 separate parameter entries, that is, the primary voltage and the voltage and current for up to five secondary windings. This can be seen more clearly from FIG. 2 wherein the first line of parameter entries data buttons is for entering the required voltage of the secondary windings 1 through 5. The second line of data buttons is for entering the desired current in the secondary windings 1 through 5, and the last entry in the third line of the parameter entries 10 on panel 20 of FIG. 2 is for entering the required primary voltage of the transformer. It is to be understood, of course, that this machine can accommodate and furnish the construction data for a transformer having up to five secondary windings. The remaining parameter entries 10b through 10g are for entering the remaining input design parameters required for designing the transformer. It may also be noticed that the layer and winding insulation parameter entry 10h has been combined for ease of illustration into a single block in FIG. 3, the parameter entry 10h similar to that for entry 10a, actually including more than a single entry. In the case of the illustrated parameter entry 10h, both the layer insulation and winding insulation information is entered through 10h.

The decimal entry 12 is for entering the magnitude information for each of the parameters 10, and any number from 0 to 999 can be entered through the decimal entry buttons 12 as shown on the illustrated front panel 20 of FIG. 2. A decimal point entry is formed as a part of the decimal entry 12 and the decimal information placed in by the operator is converted along with the decimal point information into binary coded decimal form by the converter 50. The converter 50 operates in connection with a 200 kc. clock rate to encode the decimal numbers to binary coded decimal form, and is a standard type of circuit employing a cycling counter which is stopped upon selecting the proper decimal entry by the operator. A respective gate 52a—52h is provided for each of the respective parameter entries 10, with each gate receiving the respective parameter magnitude in binary coded decimal form from the output of converter 50. The gate is normally closed, but is opened upon operation of one of the parameter entries and the respective decimal entry. Opening of the gate enables the parameter and magnitude information to be transferred therethrough.

A series of storing circuits 54a—54h comprising conventionally available reset and set flip-flops store the magnitude information for each respective parameter entry. Various apparatus in the machine is provided for performing standard arithmetic operations, such as multiplying, dividing and adding. It is to be understood, of course, that such apparatus includes common logic circuits employing shift registers, NAND, AND, and other type circuits for operating on two or more quantities in binary coded decimal form to provide an answer which, if necessary, is reconverted again into binary-coded decimal form.

The empirical data apparatus 56 includes suitable registers for storing empirical data relating to various optional parameters as a function of temperature rise and the total volt amperes of the transformer secondaries. The required parameters include the current density, the iron size, the stack size and the flux density. Thus, all of the empirical data relating to these parameters is directed from line 58 to a corresponding selecting circuit for each of the respective parameters. For instance, the current density selector 60 takes the empirical data on line 58 from the empirical data register 56, which data reflects current density as a function of temperature rise and volt amperes. The current density selector 60 then selects a value of current density which corresponds to the total volt amperes on input lines 62 and the selected value of temperature rise on input line 64.

A similar type of determination can be made for the wire size in the wire size selector 66 which obtains and chooses suitable data from the wire data register 68. In this instance, the wire data register includes data on wire size, wire diameter, DCR (ohms) per 1,000 inches and pounds per ohm. Using circular mils wire information from circular mils register 70 available on input 72 to the wire size selector 66, the selector chooses the appropriate information from register 68. Thus, the optional entries of current density, iron size, stack size, flux density, wire size, and layer and winding insulation thickness need not be entered by the operator, and the corresponding magnitudes for the parameters will be determined by the machine from the data available in the empirical data register 56 or the wire data register 68.

Figure 4:
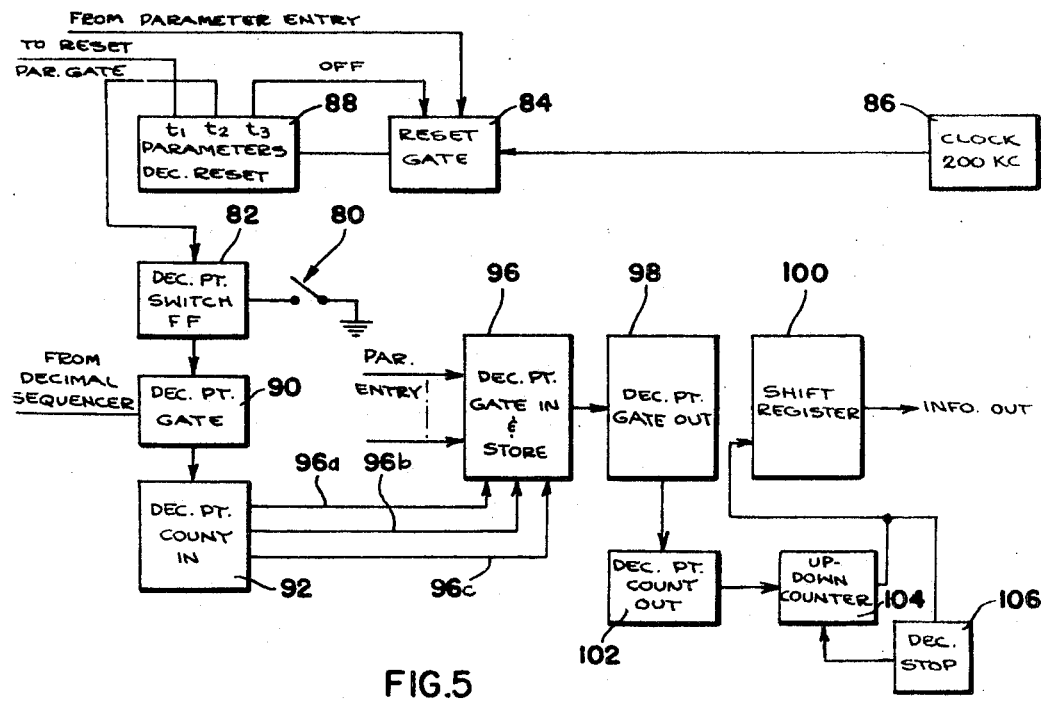
FIG. 4 is a block diagram illustrating apparatus for entering the magnitude of the input design parameter.

Referring to FIG. 4, there is illustrated the apparatus for placing the decimal point in the correct position when the particular parameter entry involves a decimal point. The operator depresses decimal point button 80 at the desired position of the decimal point during entry of the input parameter. This operates the decimal point switch flip-flop 82. As shown in FIG. 4, depression of one of the parameter entry buttons activates reset gate 84, allowing a reset pulse from clock 86 to pass through the parameter and decimal reset 88 which is coupled to the parameter gates 52 to reset the previously operated parameter gate. With an input to the decimal point switch 82 from the reset 88, and operation of the decimal point switch 80 by the operator, the output of flip-flop 82 operates decimal point gate 90 to enable the decimal sequencer which corresponds to the particular decimal entry made to pass through the gate 90 and into the decimal point counter 92. The counter 92 counts the number of places of the decimal point, which information is transferred to the decimal point gate-in and store 96. The position of the decimal point is either one of lines 96a, 96b or 96c, the decimal point capability of the illustrated machine being to the third place. Information identifying the particular parameter is also fitted to the store 96 so that the particular decimal is associated with the corresponding parameter then being operated on. Information in store 96 is gated out through gates 98 so that the actual number in binary coded form and the position of the decimal can be identified with the particular parameter and placed in a shift register 100 forming the temporary store. This information is obtained by removing the binary coded information corresponding to the magnitude of the respective parameter through gate 98, along with the position of the decimal point through the decimal point counter 102. Then, by means such as the up-down counter 104 and the decimal stop circuit 106, the correct data for the respective parameter with the correct decimal place is transferred into shift register 100 for temporary storage. For the respective parameter, the up-down counter 104 checks each decimal position to determine the number of places that the decimal point must be shifted for the particular information, and when the correct location is reached, the decimal stop circuit 106 inhibits further searching and stores the information in register 100.

In the following detailed description of the apparatus of this invention in the designing of a power transformer, it will be assumed that the full capabilities of the apparatus will be utilized. That is, in the following description it will be assumed that the operator has only entered the essential input parameters; namely, (1) primary voltage; (2) secondary 1 through 5 voltage; (3) secondary 1 through 5 current; and (4) temperature rise in degrees centigrade. The remaining optional parameters are determined by the machine as needed in accordance with the empirical data stored in the machine, such as in registers 56 and 68.

Assuming the first parameter to be entered is the voltage desired for the primary of the transformer, the operator depresses the primary voltage button and operates the decimal numbers entry buttons 12 in accordance with the magnitude of the primary voltage desired. Operation of the primary voltage parameter button sets the particular parameter flip-flop in gate 52a to open the gate which is associated with the particular parameter, resets any previous parameter gate flip-flop which had been operated, clears the register in converter and register 50, and resets the decimal point switch flip-flop 82. This operation is performed as described previously in connection with the clock 86, reset gate 84 and the parameter and decimal point reset 88 illustrated in FIG. 4. The entry of decimal numbers through decimal entry buttons 12 is encoded to binary-coded decimal form in accordance with well-known means using a cycling counter operating off the clock 86, with the binary-coded information placed into the three decade register 50. The primary voltage gate 52a transfers the desired magnitude of the primary voltage through gate 52a and into the primary voltage store 54a which, as described previously, comprises a series of reset and set flip-flops. It is to be understood that standard means (not shown) have been provided for enabling the operator to depress the parameter button in which he has entered the magnitude information to obtain a display on the readout 22 of the information entered for the particular parameter being checked. The remaining essential parameter entries involving the desired voltage for the transformer secondary windings 1 through 5, and the desired temperature rise is gated in and stored in the respective stores 54.

To initiate the design operation, the operator depresses design button 24 which initiates the sequencing operation controlled by the control unit 26. The control unit is an automatic programmed sequencing unit whose timing is determined by the 200 kc. clock and whose sequencing operations are determined by the counter which operates off of the clock and controls the individual circuits through the respective gates.

In the multiplier and adder 110, the product of the voltage and current of each secondary is obtained and the individual volt ampere product (VA) is added in the same unit. For convenience, this operation has been indicated as being in one multiplier and adder unit 110, although it is to be understood that as in subsequent arithmetic operations to be described herein, the actual units may involve separate circuits. However, each of these arithmetic circuits is of a well-known type. For purposes of illustration, in an actual constructed unit of the apparatus illustrated herein solid state units manufactured by Texas Instruments Inc. and designated as Integrated Circuits of the SN7400N series, were utilized. The total VA of the secondary windings is then transferred to the VA register 112. Using the VA information stored in register 112, the machine then proceeds in the programmed sequence set in control unit 26 to determine some of the optional parameters which have not been entered by the operator. The total VA data is fed into the circular mils per amp selector 60 on input line 62, and into the iron size selector 114, stack size selector 116, and the magnetic flux density (B) selector 118 on similar inputs. It can be seen from FIG. 3 that similar inputs to these selectors is obtained from the temperature rise store 54G. The selector circuits 60, 114, 116 and 118 illustrated in block form comprise the combination of logic circuits which, from the VA and temperature rise information, determine from the empirical data of register 56 the optional parameter entries for current density, iron size, stack size, and magnetic flux density. The VA is calculated and the temperature rise is selected by the operator. The optional parameters are then selected by use of the VA and temperature rise information along with the empirical data in register 56. It is to be noted that the empirical data stored in register 56 is available through output line 58 as an input into each of the c.m./a., IS, SS and B selectors.

Figure 5:
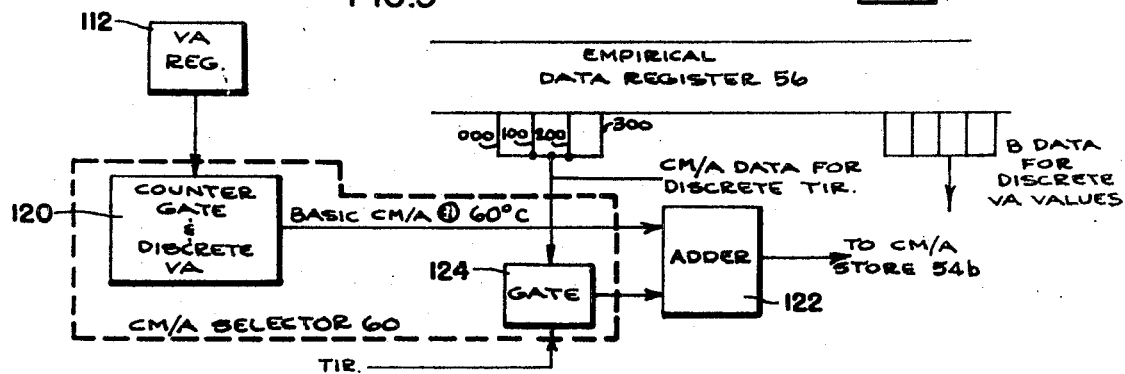
FIG. 5 illustrates in block diagram form apparatus for selecting from one of the data registers of FIG. 3 the corresponding value and optional input design parameter in accordance with the value of two essential parameters.

As an example of the calculation of one of the optional parameters, reference may be had to FIG. 5 wherein there is illustrated the current density or circular mils/amp (c.m./a. selector 60, which receives input data from the temperature rise store 54f corresponding to the desired temperature rise for the transformer, the total secondary VA from VA register 112 and c.m./a. data for discrete VA values from the empirical data register 56. The empirical date register 56 contains c.m./a. data for several discrete VA values, and since the c.m./a. is also a function of temperature rise, a basic set of discrete values of c.m./a. corresponding to a temperature rise of 60° centigrade is in the register. For each 10° temperature increment down from 60° C., 100 c.m./a. must be added to the basic value of c.m./a. corresponding to 60° C. This is accomplished in the following manner. Countergate 120 counts the particular value of VA in VA register 112 and gates out a corresponding value of c.m./a. at 60° C. to adder 122. Using the temperature rise information in store 54g, a corresponding increment of c.m./a. from empirical data register 56 is gated through gate 124 to adder 122 for combining with the basic c.m./a. data. The output of adder 122 is transferred to c.m./a. store 54b.

The magnetic flux density is determined by B selector 118 in a similar manner as the c.m./a. selection previously described. The stack size selector 116 utilizes the same principle, but in this case slightly different arithmetic operations are performed. For stack size determination the actual VA in register 112 is multiplied in selector 118 by a correction factor determined by the difference between the desired temperature rise and 60° C. This determines the modified VA value in binary-coded decimal form. Then a counter, similar to the countergate 120, counts from the modified VA value to the next discrete VA value to determine the corresponding stack size parameter which is entered into the stack size store. For the determination of iron size, a corresponding value of iron size is gated out by selector 114 for a particular value of temperature rise and VA.

Using empirical data relating to a correction value known as the efficiency factor ($E_{ff}$), and the total $VA$ from register 112, the efficiency factor selector 126 provides the correct value of $E_{ff}$ to be used in calculating the primary current $I_p$. The efficiency factor is a correction value which accounts for the increasing efficiency of a transformer as a function of increasing values of VA. In divider-multiplier 128 the total VA from register 112 is divided by the value of primary volts, $V_p$, with the result multiplied by the efficiency factor $E_{ff}$, the product being the primary current in accordance with the well-known equation $I_p=((VA)/V_p) E_{ff}$. The resulting value is transferred into the primary current register 130.

The next parameter to be determined is the wire size, assuming that the operator has not entered this optional parameter. To determine the wire size of the primary winding, the product of primary current in $I_p$ register 130 and the current density in c.m./a. from store 54b is obtained through multiplier 132 with the result stored in the circular mils register 70. The wire size of each of the secondary windings can be obtained in a similar manner by initially obtaining the product of the secondary current in each of the secondary windings stored in store 54 and the current density from store 54b. Thus, the circular mils register 70 contains data representing the wire size in circular mils for the primary winding and each of the secondary windings.

As explained previously, the wire data register 68 contains data information relating to the normal size of wires used for winding power transformers. For each wire size, normally given in a B&S gauge number, there is also stored information pertaining to wire diameter, circular mils, ohms/1,000 inches and pounds/ohms. For instance, for a No. 20 gauge wire size, there is also stored in wire data register 68 for this particular wire size, a diameter of 0.0334 inch, and 1,022 circular mils, this particular wire size exhibiting 0.845 ohms per 1,000 inches, and having 0.3110 pounds/ohms. It is to be noted from standard wire size tables, that for a change in the wire size, for instance in going from No. 20 gauge to No. 10 gauge wire, the remaining factors of circular mils, wire diameter, ohms per thousand inches, and pounds per ohm can be obtained by either multiplying or adding to the corresponding value for these parameters at No. 20 gauge. This, from the information on circular mils in the register 70 the other values can be obtained from the wire data register.

Figure 6:
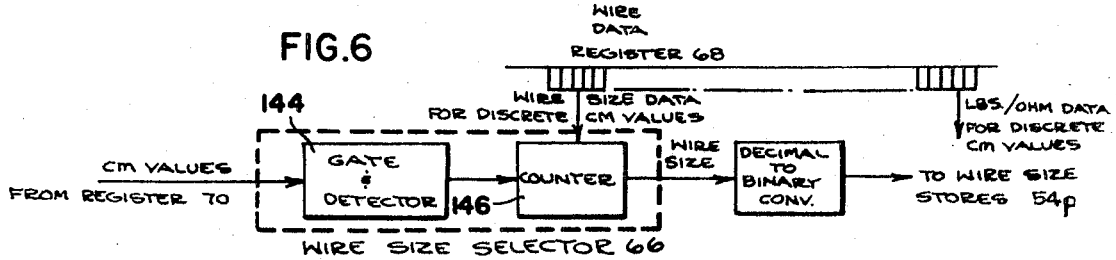
FIG. 6 illustrates in block diagram form the selection of a value of wire size from another of the registers shown in FIG. 3 in accordance with a corresponding value of an optional input design parameter.

Referring to FIG. 6 there is illustrated an example using the c.m. values from register 70 for the determining of the wire size by wire size selector 66. In the wire size selector 66 the circular mils values from register 70 is gated through the gate and detector 144. The counter 146 counts the discrete values of the circular mils information and counts the discrete values of wire size below No. 10 wire. Simultaneously, the counter 146 obtains the wire size data for discrete circular mils values (i.e., values of Nos. 10, 12, 14, etc., wire sizes for discrete c.m. values) from the wire data register 68. When the counter has completed counting the number of discrete values of circular mils input from register 70, the corresponding value for wire size data from wire data register 68 is gated and transferred to the respective primary winding wire size store 54f after suitable conversion in a decimal to binary converter 148. As an example, assuming a value of 3,015 circular mils input from c.m register 70 to gate 144, only discrete values are transferred through gate 144 and are counted by counter 146. The counter 146 in this instance will count five discrete values of circular mils sizes below the circular mils size for No. 10 gauge wire. With the corresponding gauge size being placed into the counter 146 from register 68, the counter effectively moves from No. 10 gauge to No. 11 gauge, 12, 13, 14, and resting on No. 15 gauge. Thus, this is a wire size corresponding to the circular mils value in register 70 and this information is transferred to the respective wire size store. The remaining information contained in the wire data register 68 can be similarly selected, in some cases the data must be multiplied or increments must be added corresponding to the discrete number of values of circular mils below No. 10 gauge wire.

The next item to be determined is the number of turns required on the primary winding. This item is normally determined from the equation presented previously as $$N_p = \frac{V_p(10^8)}{4.44fKBA}.$$

$K$ is a stacking factor taking into account the fact that the iron laminations cannot be stacked together 100 percent. Normally, the stacking factor $K$ is taken as 0.9. Combining the 4.44 constant, the stacking factor, and the frequency $f=60$ hertz, the equation becomes $$N_p = \frac{V_p(10^8)}{240B(IS)(SS)}$$

Figure 8:
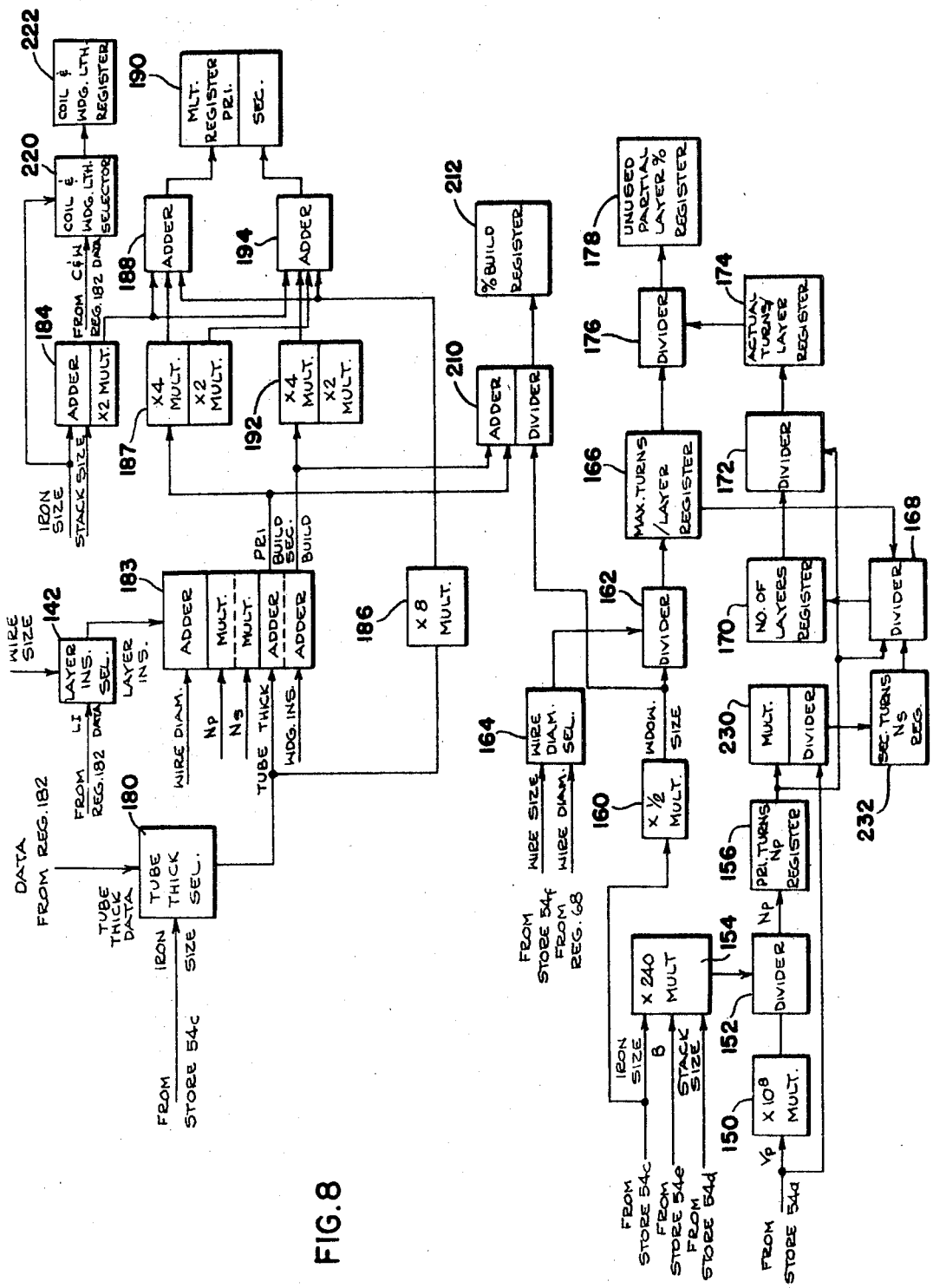

As shown in FIG. 8, the value of primary volts $V_p$ as obtained from primary volts store 54a and multiplied by $10^8$ in multiplier 150 is then transferred to divider 152. The product of magnetic flux density, $B$, the stack size, $SS$, and the iron size, $IS$, is obtained from multiplier 154 and also transferred to divider to divider 152. A constant multiplier equal to 240 is set in on multiplier 154. The resulting quotient from divider 152 represents the number of primary turns which is then transferred to the primary turns register 156.

Figure 7:
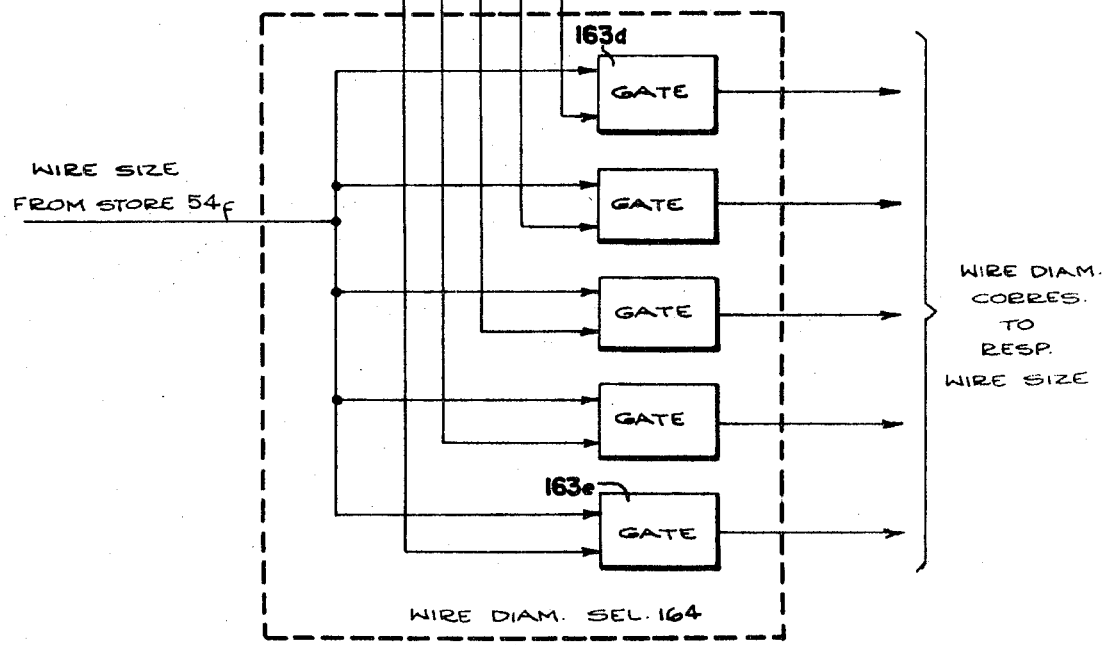
FIG. 7 illustrates in block diagram form the selection of a wire diameter corresponding to a particular wire size required in determining the output construction data.
Figure 9:
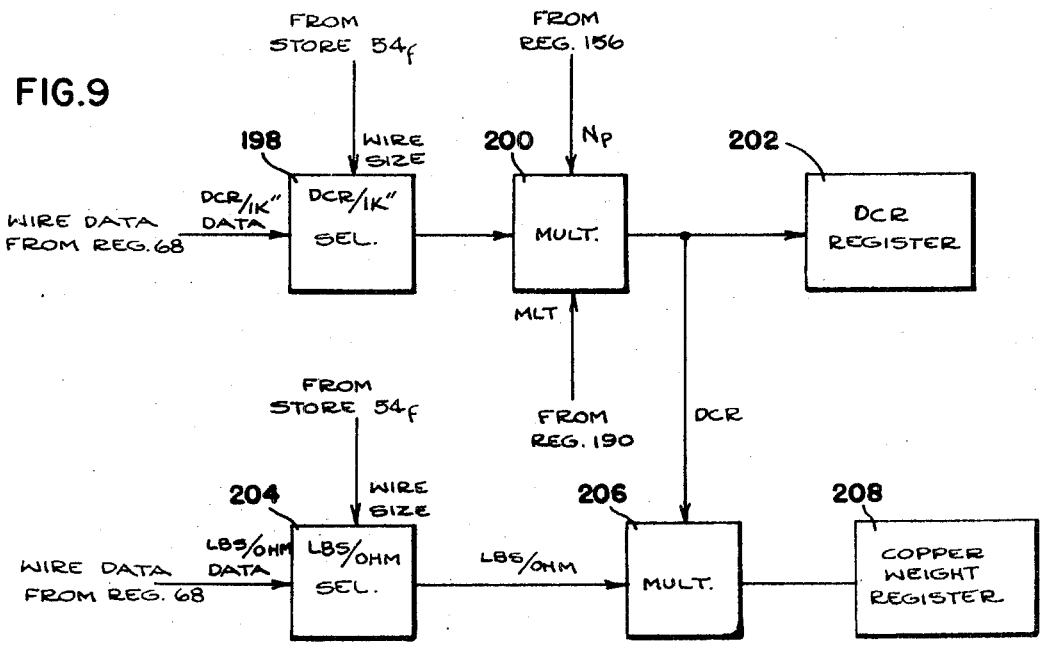
FIGS. 8 and 9 are schematic diagrams illustrating apparatus according to the present invention, which in conjunction with the apparatus of FIG. 3 provides the remaining output construction data required for constructing a power transformer.

The next output data which is to be determined is the maximum turns per layer. This output information can be determined by dividing the available space for windings on the lamination by the diameter of the particular wire size. The available space in an E-type lamination is known as "window size" and is equal to one-half of the iron size. Therefore, referring to FIG. 8, the iron size from the iron size store is halved by the half multiplier 160 to obtain the window size, which information is transferred to divider 162. Referring to FIG. 7, using the wire size information from store 54f, the corresponding value of wire diameter from wire data register 68 through gates 163a—163e in wire diameter selector 164 is selected. The corresponding wire diameter for the primary is also transferred to divider 162. The resulting quotient from divider 162, obtained by dividing the window size by the wire diameter, is the maximum turns per layer which is transferred to register 166.

The output of the maximum turns per layer register 166 is transferred to a divider 168 to which is also transferred the value for the number of primary turns from register 156. The resulting quotient from divider 168 determines the number of layers which is stored in register 170. The number of turns from register 156 divided by the number of layers in register 170 is accomplished by divider 172, with the resulting number of actual turns per layer stored in register 174. Dividing the actual turns per layer from register 174 by the maximum turns per layer from register 166 in divider 176 provides the unused space on the final layer. This information is stored in an unused partial layer (percent) register 178.

The next output data which is to be determined by the apparatus of this invention is the copper weight and DC resistance of the primary winding. This requires that the actual primary build be calculated. The primary build is the thickness of the primary winding; that is, the distance from the top of the iron core or laminations to the top of the primary winding. Since each layer of the primary winding is defined by the wire diameter of the primary winding and the insulation between each layer, the thickness of the primary winding is determined by multiplying the number of layers in the primary times the thickness of each layer. There must also be taken into account in this calculation of the primary build the thickness of an insulating tube which surrounds the center leg of the laminations upon which the primary coil is wound. For each discrete value of iron size there is a respective value of tube thickness. Therefore, the value of tube thickness can be selected from the discrete value of iron size in the iron store 54c in a manner similar to that previously described in connection with the selection of the wire diameter from the discrete value of wire size as illustrated in FIG. 7. Thus, the discrete value of iron size transferred to the tube thickness selector 180 enables the respective tube thickness information from data register 182 to be selected. Since the actual build of the primary winding is equal to Number of Primary Layers ($W_{diam.}$ + Layer Ins.) + Tube Thick., the value of tube thickness is transferred to an adder-multiplier-adder 183 which performs the indicated operations.

To determine the means length of turn for the primary winding, the winding is assumed to be square shaped. By examining the physical configuration of the primary winding wound around the tube on the center leg of the laminations, it can be shown that the mean length turn can be determined by adding together the inside perimeter of the tube, eight times the thickness of the tube, and four times the primary build. As an approximation, the inside perimeter of the tube can be found by doubling the sum of the iron size and stack size. This is accomplished by adder-doubler 184 as shown in FIG. 8. An eight-times multiplier 186 similarly takes the tube thickness and correspondingly operates on this data, transferring the same to the adder 188. Four-times multiplier 187 operates on the primary build from adder-multiplier-adder 183 and the result is coupled to adder 188. The output of adder 188 is the sum of the parameters previously indicated which results in the mean length turn stored in MLT register 190.

In determining the build for each secondary winding, similar calculations are made, with the additional information and calculations shown in the dashed lines in FIG. 8. For instance, for the build of the first secondary winding, this value is given by Sec. Build = (Number of Layers, $S_1$) ($W_{diam.}$ + Ins. Layer) + Wrapper Insulation, where $W_{diam.}$ is the diameter of the wire in secondary coil, Ins. Layer is the thickness of the insulation used between layers forming the secondary winding, and the Wrapper Insulation is the thickness of the insulation used between the primary coil and the secondary coil. The value for the wrapper or winding insulation is ordinarily dictated by the wire size for the winding on the basis of mechanical considerations concerning the thickness of the insulation necessary to support the windings. Therefore, this information can ordinarily be obtained from the layer and winding insulation selector 142 in connection with the wire size input to the selector in a manner similar to that in which the layer insulation is determined, that is, by the discrete value of wire size gating out the corresponding associated value of winding insulation. However, occasionally, the winding insulation is to be based on an electrical consideration concerning the breakdown between windings, which would require a particular value of dielectric between the windings, so that in the apparatus of this invention the operator may also insert a value for the winding insulation through parameter entry button 10h. In any event, the adder-multiplier-adder 183 processes the $N_S$, $W_{diam.}$, the Ins. Layer, and the Wrapper Ins. information and transfers the resulting secondary build information to a four-times multiplier-doubler 192. The secondary build information is operated on by the four-times multiplier and the resulting product is applied to adder 194. Also, the product of the primary build and the four-times multiplier 187 is doubled and also transferred to adder 194. Again, by examining the physical configuration of the coils on the center leg of the lamination, it can be shown that the mean length turn for the first secondary winding can be found in the following manner: MLT (Sec.$_1$) = 2(Iron Size + Stack Size) + 8 Tube Thick. + 8 Pri. Build + 4 Sec.$_1$ Build. The output from adder 194 which represents the mean length turn for the first secondary winding is transferred to the corresponding portion of the mean length turn register 190. The remaining mean length turns for the other secondary windings are obtained in a similar manner and also transferred to the register 190. For convenience of illustration, this has not been shown on the drawings, although it is to be understood that the apparatus for providing such results can be readily obtained in accordance with the above teachings.

Two other output parameters which are obtained in a similar manner are the DC resistance (DCR) and the copper weight. These values are determined for the primary winding and for each of the secondary windings, the computations in each instance being the same, with only a change in the respective input information. As an example, the DCR is calculated by obtaining the DCR/1,000 inches data for the particular wire size which is obtained from DCR/1,000 inches selector 198 with gating apparatus similar to that shown in FIG. 7 in connection with selecting wire diameter. From the equation DCR (PRI.) + DCR/1,000 inches [MLT (No. of Primary Turns)], (See FIG. 7), the resulting product from multiplier 200 results in the DCR for the primary winding which is transferred to the DCR and copper weight register 202. The wire size for the primary winding also dictates the pounds/ohms value which is selected from information in the wire data register 68 by the pounds/ohms selector 204. The product of the selected pound/ohms for the particular wire size and the previously obtained values in DCR in multiplier 206 represents the copper weight for the primary winding which is transferred to copper weight register 208. In a similar manner, the DCR and the copper weight for the secondary winding can be determined and stored in respective positions in the illustrated registers in FIG. 9.

The remaining output parameter which is to be determined is the percent build which corresponds to the amount of space taken up by the combined primary and secondary windings in the available window space. To obtain this design parameter the actual build of the primary winding and the build from each of the secondary windings is added in adder-divider 210. Dividing this sum by the available space between the lamination legs, known as the window size, the percent build is obtained and stored in percent build register 212.

From information stored in miscellaneous data register 182, concerning coil and winding lengths for particular discrete values of irons size, the value of these parameters can be determined in a manner similar to the gating apparatus of FIG. 7. In the coil and winding length selector 220 the corresponding values for these parameters from the data register 182 are gated out of the selector by the value of input iron size to the selector in the same manner as indicated in FIG. 6 for the circular mils and wire size information. The resulting values are stored in respective portions of the coil and winding length register 222. The coil length represents the entire length of the coil considering the overhang from the insulation between each layer, whereas the winding length valve represents the actual length of the windings on the center leg of the transformer core.

Many of the operations and calculations which have been described previously in connection with determinations involving the primary winding are also performed for each of the secondary windings. In the information regarding the number of turns for each secondary winding, such information can be determined by the product of the number of primary turns and the ratio of the particular secondary voltage to the primary voltage. This arithmetic operation is performed in multiplier-divider 230 with the respective results for each of the corresponding secondary windings stored in appropriate portions of the secondary turns register 232. Dividing the maximum turns per layer for the particular secondary winding from register 166 by the number of the particular secondary turns from register 232, the corresponding number of layers for the respective secondary winding is stored in a respective portion of the register 170. It is to be understood that the calculations previously detailed in connection with wire size, layer and winding insulation, etc. are determined in a manner similar to that detailed for the primary parameters.

Output construction data is therefore obtained in each of the respective registers, some of which relates to specific parameters for each of the primary and secondary windings, and other data, such as temperature rise, primary load current, iron size, stack size and percent build which relates to the overall transformer. To obtain this information from the registers, the operator depresses for instance the corresponding button in the group of output data buttons 46. For instance, if he is requesting the calculated output design parameters connected with the primary winding, the PRI button is depressed along with the button connected with the particular parameter desired for the primary winding. Thus, if the operator depresses the PRI and the TURNS buttons the value for this parameter is gated out from register 156 in a well-known manner and presented to the output display 18 in decimal form on the character readout 22. Design information regarding the wire size, turns per layer, and number of layers can be determined in a similar manner for the primary winding and each of the respective secondary windings. Since the values related to temperature rise, primary load current, iron size, stack size and percent build relate to the overall transformer, depression of the respective buttons for these parameters immediately transfers the corresponding information from the respective registers to the display 18. When the operator is satisfied with the design data, he can depress the "print" button to obtain a permanent record from the printer 32. In the alternative the apparatus can be arranged so that as the operator requests the design parameters the output printer 32 can print a corresponding current record of the data.

Various alternative embodiments utilizing the apparatus of this invention can, of course, be provided within the skill of the art. For instance, the basic apparatus of this invention can be accessed by a number of remote stations, each of the remote stations containing an entry device for entering parameter and decimal numbers into the apparatus, identification apparatus identifying the particular remote station, and preferably an output display either of the immediate "temporary" display type 18, or an actual output printer such as printer 32. Such a system would have desirable application in an engineering research center where a single central machine containing the apparatus of this invention can be accessed by a number of research personnel at remote stations. Each of the remote stations can be sequentially scanned by the central apparatus so as to input information from a particular requesting remote station and after performing the operations as indicated previously, transmit the particular design parameters to the requesting station.

Therefore, the foregoing detailed description has been given for clearness of understanding only, and no unnecessary limitations should be understood therefrom, as modifications will be obvious to those skilled in the art.

What I claim is:

1. Apparatus for determining the values of output construction parameters required for constructing a wire wound electrical element in accordance with certain essential input design parameters which must be specified, and certain optional input design parameters which may not be specified, said apparatus comprising:

input data means including means for entering and storing data corresponding to the essential ones of said input design parameters;

first memory register means for storing data, including empirical data relating to the values of certain optional parameters as a function of respective ones of said essential parameters;

first selector means coupled to said empirical data in said first memory register for selecting said empirical data relating to respective optional parameters in response to said corresponding essential parameters;

second memory register means for storing data, including data relating to the remaining optional parameters as a function of respective ones of the optional parameters selected in response to the essential parameters;

second selector means coupled to said data in said second memory register and responding to said selected optional parameters for selecting said data relating to the remaining optional parameters;

storage means for respectively storing data relating to each of said selected optional parameters;

a plurality of arithmetic calculating devices connected to said input data means, each of said register means, and to said storage means for calculating from said respective data stored therein data relating to the values of said respective output construction parameters;

output register means for storing said data relating to the calculated output construction parameters;

a plurality of gates interconnecting the input data means, the calculating devices, each of said register means, and said storage means for transferring or inhibiting the transfer of data therebetween; and programmed control means for sequentially controlling said plurality of gates to selectively transfer said respective data during the entering and storing parameters, the selection and storing of said data corresponding to said essential parameters, the selection and storing of data relating to said optional parameters, and the calculation and storing of said data relating to said output construction parameters.

2. Apparatus as claimed in claim 1, including display means selectively displaying data relating to said entered essential parameters, the selected optional parameters, and the calculated output construction parameters.

3. Apparatus as claimed in claim 1, including third memory register means for storing data, including data relating to the calculation of certain factors as a function of respective ones of said essential and optional parameters, said calculation factors being required for calculating the values of said output construction parameters;

third selector means having access to said data in said third memory register and responding to the data relating to said essential and optional parameters for selecting said data relating to the corresponding calculation factor; and said third register means and selector means being interconnected by corresponding gates for sequentially controlling the transfer of said data by said programmed control means.

4. Apparatus as claimed in claim 1, wherein said first selector means includes means for responding to the data stored in said input data means relating to one of said essential parameters for determining preliminary data corresponding to the optional parameter being selected, said first selector means further including means for receiving data from said first memory register means relating said optional parameter to be selected to another of said essential parameters, means for responding to data relating to said other essential parameter for selecting a particular one of said received data, and means for combining said data selected by said respective essential parameters for determining corresponding data related to the optional parameter being selected.

5. Apparatus for determining the values of output construction parameters required for constructing a power transformer in accordance with certain essential and optional input design parameters, said apparatus comprising:

input data means including means for entering and storing data relating to the transformer primary voltage, $V_p$, the voltages, $V_s$, and currents, $I_s$, of the transformer secondaries, the desired transformer temperature rise, $T_r$, and data corresponding to each of said optional input design parameters;

memory means including a register for storing data relating the values of certain optional parameters as a function of $V_p$, $V_s$, $I_s$ and Tr;

selector means coupled to said data in said memory means for selecting said data relating to respective optional parameters in response to the data stored in said input data means related to $V_s$, $I_s$ and Tr;

programed sequential control means for controlling the selection of respective optional parameters not previously entered and stored in said input data means, and for entering and storing said selected optional parameters in said input data means;

calculating and gate means connected to said input data means for receiving said stored data therein and for calculating data relating to said output construction parameters in response to said programmed sequential control means; and output register and display means responding to said sequential control means for storing and displaying said calculated data relating to said output construction parameters.

6. Apparatus as claimed in claim 5, including storage means for storing data relating to certain calculation factors as a function of $V_s$, $I_s$, and certain ones of said optional parameters, said calculation factors being required for calculating the values of said output construction parameters;

calculation factor selection means coupled to said data in said storage means for selecting corresponding data relating to said calculation factors in response to the corresponding data stored in said input data means related to $V_s$, $I_s$ and said certain optional parameters;

the output of said calculation factor selector means coupled to said calculating and gate means for determining values of said output construction parameters.

7. Apparatus as claimed in claim 5 for selectively displaying and recording the calculated data relating to said output construction parameters.

8. Apparatus for determining the values of output construction parameters required for constructing a power transformer in accordance with certain essential and optional input design parameters, said apparatus comprising:

input data means including means for entering and storing data relating to the transformer primary voltage, $V_p$, the voltages, $V_s$, and currents, $I_s$, of the transformer secondaries, and the desired transformer temperature rise, Tr;

memory means including a register for storing data relating the values of certain optional parameters as a function of $V_p$, $V_s$, $I_s$ and Tr;

selector means, coupled to said data in said memory means for selecting said data relating to respective optional parameters in response to the data stored in said input data means related to $V_s$, $I_s$ and Tr;

programmed sequential control means for controlling the selection of respective optional parameters and for entering and storing said selected optional parameters in said input data means;

calculating and gate means connected to said input data means for receiving said stored data therein and for calculating data relating to said output construction parameters in response to said programmed sequential control means.

9. Apparatus as claimed in claim 8, wherein said input data means includes means for selectively entering and storing data corresponding to said optional input design parameters.

10. Apparatus as claimed in claim 8, including storage means for storing data relating to certain calculation factors as a function of $V_s$, $I_s$, and certain ones of said optional parameters, said calculation factors being required for calculating the values of said output construction parameters;

calculation factor selection means coupled to said data in said storage means for selecting corresponding data relating to said calculation factors in response to the corresponding data stored in said input data means related to $V_s$, $I_s$ and said certain optional parameters;

the output of said calculation factor selector means coupled to said calculating and gate means for determining values of said output construction parameters; and output register and display means responding to said sequential control means for storing and displaying said calculated data relating to said output construction parameters.

11. Apparatus as claimed in claim 10 for selectively displaying and recording the calculated data relating to said output construction parameters.

12. Apparatus for determining the values of output construction parameters required for constructing a power transformer in accordance with certain essential input design parameters which must be specified, and certain optional input design parameters which may not be specified, said apparatus comprising:

input data means including means for entering and storing data relating to the transformer primary voltage $V_p$, the voltages, $V_s$, and currents, $I_s$, of the transformer secondaries, and the desired transformer temperature rise, Tr;

first memory register means for storing data, including empirical data relating to the values of certain optional parameters as a function of respective ones of said essential parameters;

first selector means coupled to said empirical data in said first memory register for selecting said empirical data relating to respective optional parameters in response to said corresponding essential parameters;

second memory register means for storing data, including data relating to the remaining optional parameters as a function of respective ones of the optional parameters selected in response to the essential parameters;

second selector means coupled to said data in said second memory register and responding to said selected optional parameters for selecting said data relating to the remaining optional parameters;

storage means for respectively storing data relating to each of said selected optional parameters;

a plurality of arithmetic calculating devices connected to said input data means, each of said register means, and to said storage means for calculating from said respective data stored therein data relating to the values of said respective output construction parameters;

output register means for storing said data relating to the calculated output construction parameters;

a plurality of gates interconnecting the input data means, the calculating devices, each of said register means, and said storage means for transferring or inhibiting the transfer of data therebetween; and programmed control means for sequentially controlling said plurality of gates to selectively transfer said respective data during the entering and storing of said data corresponding to said essential parameters, the selection and storing of data relating to said optional parameters, and the calculation and storing of said data relating to said output construction parameters.

13. Apparatus as claimed in claim 12 including display means selectively displaying data relating to said entered essential parameters, the selected optional parameters, and the calculated output construction parameters.

14. Apparatus as claimed in claim 12 wherein said input data means includes means for selectively entering and storing data corresponding to said optional input design parameters.

PO-1050
(5/69)

UNITED STATES PATENT OFFICE
CERTIFICATE OF CORRECTION

Patent No. 3,598,977      Dated August 10, 1971

Inventor(s) James H. Clemmons

It is certified that error appears in the above-identified patent and that said Letters Patent are hereby corrected as shown below:

Column 2, line 24, "f" should be --$f^p$--.

Column 5, line 16, delete "TZPS".

Column 5, approx. line 43, "(Eff)" should be --$(E_{ff})$--, both occurrences.

Column 8, line 67, "(cm/a" should be --(cm/a)--.

Column 9, line 40, after "parameter" insert --.--

Column 9, line 67, "This" should be --Thus--.

Column 11, line 29, "means" should be --mean--.

Column 11, line 53, after "in" insert --the--.

Column 12, line 26, "DCR/1,000" should be --DCR/1K--.

Column 12, line 37, "values in" should be --values for--.

Column 12, line 54, "irons" should be --iron--.

Column 12, line 65, "valve" should be --value--.

Column 14, lines 28, 29, delete "parameters, the selection and storing".

Signed and sealed this 1st day of August 1972.

(SEAL)
Attest:

EDWARD M. FLETCHER, JR.
Attesting Officer

ROBERT GOTTSCHALK
Commissioner of Patents